US009456346B2

(12) United States Patent
Wang et al.

(10) Patent No.: US 9,456,346 B2
(45) Date of Patent: *Sep. 27, 2016

(54) METHOD AND SYSTEM FOR IMPROVING CLIENT SERVER TRANSMISSION OVER FADING CHANNEL WITH WIRELESS LOCATION AND AUTHENTICATION TECHNOLOGY VIA ELECTROMAGNETIC RADIATION

(71) Applicant: Virginia Innovation Sciences, Inc., Alexandria, VA (US)

(72) Inventors: Tiehong A. Wang, Arlington, VA (US); Tiejun Wang, Arlington, VA (US); Guang Zeng, Port Jefferson Station, NY (US); Ning Wang, Beijing (CN)

(73) Assignee: Virginia Innovation Science, Inc, Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,156

(22) Filed: Mar. 5, 2015

(65) Prior Publication Data

US 2015/0245208 A1    Aug. 27, 2015

Related U.S. Application Data

(63) Continuation of application No. 13/537,418, filed on Jun. 29, 2012, now Pat. No. 8,843,931, which is a continuation of application No. 12/926,716, filed on Dec. 7, 2010, now Pat. No. 8,285,211, which is a (Continued)

(51) Int. Cl.
*H04W 12/06* (2009.01)
*H04L 29/06* (2006.01)

(Continued)

(52) U.S. Cl.
CPC .......... *H04W 12/06* (2013.01); *G06F 11/3003* (2013.01); *G06F 11/3419* (2013.01);

(Continued)

(58) Field of Classification Search
CPC ...... H04L 63/08; H04L 67/42; H04W 12/06; H04B 5/0031; G06F 11/3419; G06F 11/3003; G06F 2201/865; G06F 2201/80; G06F 2201/88

See application file for complete search history.

(56) References Cited

U.S. PATENT DOCUMENTS 5,649,118 A    7/1997  Carlisle
5,880,732 A    3/1999  Tryding (Continued)

FOREIGN PATENT DOCUMENTS

CN    2660808 Y    12/2004
CN    1657003 A    8/2005

(Continued)

*Primary Examiner* — Joseph Dean, Jr.

(57) ABSTRACT

Wireless personal area network (Zigbee, Bluetooth, UWB) and wireless identification technologies (Near Field Communication (NFC), Radio Frequency Identification (RFID)) are implemented in particular client server functions and communications. Connected with an Authentication Server, a wireless HUB authenticates user identification and provides the user with access to secure data communication with a wireless terminal such as a cellular phone or a PDA. A Location Server provides user locations via methods such as RSSI, TDOA, and GPS and sends location information to a Center Control Server and the Authentication Server. With location information, the Center Control Server initiates and optimizes secure information processes and coordinates the functions of servers and user terminals.

78 Claims, 10 Drawing Sheets

Related U.S. Application Data continuation of application No. 12/684,377, filed on Jan. 8, 2010, now Pat. No. 7,983,616, which is a continuation of application No. 11/540,637, filed on Oct. 2, 2006, now Pat. No. 7,647,024.

(60) Provisional application No. 60/832,962, filed on Jul. 25, 2006.

(51) Int. Cl.
*H04B 5/00* (2006.01)
*G06F 11/34* (2006.01)
*G06F 11/30* (2006.01)

(52) U.S. Cl.
CPC ............. *H04B5/0031* (2013.01); *H04L 63/08* (2013.01); *H04L 67/42* (2013.01); *G06F 2201/80* (2013.01); *G06F 2201/865* (2013.01); *G06F 2201/88* (2013.01)

(56) References Cited

U.S. PATENT DOCUMENTS

| | | |
|---|---|---|
| 5,920,848 A | 7/1999 | Schutzer |
| 6,084,522 A | 7/2000 | Addy |
| 6,227,447 B1 | 5/2001 | Campisano |
| 6,305,603 B1 | 10/2001 | Grunbok |
| 6,555,995 B2 | 4/2003 | Shih |
| 6,593,860 B2 | 7/2003 | Lai |
| 7,010,551 B2 | 3/2006 | Terayama |
| 7,024,601 B2 | 4/2006 | Quinlan |
| 7,076,523 B2 | 7/2006 | Schneider |
| 7,102,591 B2 | 9/2006 | Shih |
| 7,209,874 B2 | 4/2007 | Salmonsen |
| 7,249,112 B2 | 7/2007 | Berardi |
| 7,286,651 B1 | 10/2007 | Packingham |
| 7,295,608 B2 | 11/2007 | Reynolds |
| 7,426,329 B2 | 9/2008 | Calhoon |
| 7,490,171 B2 | 2/2009 | Saint-Hilaire |
| 7,505,889 B2 | 3/2009 | Salmonsen |
| 7,519,363 B2 | 4/2009 | Shin |
| 7,574,514 B2 | 8/2009 | Deshpande |
| 7,613,893 B2 | 11/2009 | Saint-Hilaire |
| 7,693,522 B2 | 4/2010 | Bichot |
| 8,036,265 B1 | 10/2011 | Reynolds |
| 2002/0066115 A1 | 5/2002 | Wendelrup |
| 2002/0078149 A1 | 6/2002 | Chang |
| 2002/0116265 A1 | 8/2002 | Hernandez |
| 2002/0118762 A1 | 8/2002 | Shakiba |
| 2002/0167587 A1 | 11/2002 | Ogasawara |
| 2002/0180600 A1 | 12/2002 | Kirkland |
| 2002/0181710 A1 | 12/2002 | Adam |
| 2002/0188575 A1 | 12/2002 | Freeny |
| 2003/0126293 A1 | 7/2003 | Bushey |
| 2003/0141361 A1 | 7/2003 | Nguyen |
| 2003/0149662 A1 | 8/2003 | Shore |
| 2003/0153351 A1 | 8/2003 | Jung |
| 2003/0187796 A1 | 10/2003 | Swift |
| 2003/0204726 A1* | 10/2003 | Kefford .................. G06F 21/42 713/171 |
| 2004/0015450 A1 | 1/2004 | Zingher |
| 2004/0023666 A1 | 2/2004 | Moon |
| 2004/0057199 A1 | 3/2004 | Azuchi |
| 2004/0117426 A1 | 6/2004 | Rudkin |
| 2004/0243496 A1 | 12/2004 | Kim |
| 2005/0021586 A1 | 1/2005 | Bichot |
| 2005/0079817 A1* | 4/2005 | Kotola ................... G06Q 20/20 455/41.2 |
| 2005/0086164 A1 | 4/2005 | Kim |
| 2005/0228720 A1 | 10/2005 | Pavlic |
| 2005/0266798 A1* | 12/2005 | Moloney ............. H04L 63/0435 455/41.2 |
| 2006/0013170 A1 | 1/2006 | Shin |
| 2006/0074698 A1 | 4/2006 | Bishop |
| 2006/0253392 A1 | 11/2006 | Davies |
| 2009/0103509 A1 | 4/2009 | Sanderford |
| 2013/0185202 A1 | 7/2013 | Goldthwaite |

FOREIGN PATENT DOCUMENTS

| | | |
|---|---|---|
| CN | 1835007 A | 9/2006 |
| CN | 1889118 A | 1/2007 |
| CN | 102160410 A | 8/2011 |
| CN | 102204354 A | 9/2011 |
| JP | 2002-101457 | 4/2002 |
| JP | 2002-352333 | 12/2002 |
| JP | 2003-16526 | 1/2003 |
| JP | 2003-44765 | 2/2003 |
| JP | 2003-99687 | 4/2003 |
| JP | 200399687 | 4/2003 |
| JP | 2007018472 A | 1/2007 |
| KR | 20000037185 | 4/2000 |
| KR | 100678772 B1 | 7/2000 |
| KR | 20000037185 A | 7/2000 |
| KR | 20000049809 A | 8/2000 |
| KR | 20000064136 A | 11/2000 |
| KR | 100444213 B1 | 1/2002 |
| KR | 20020005995 A | 1/2002 |
| KR | 20020030313 | 4/2002 |
| KR | 20020030313 A | 4/2002 |
| KR | 100724210 B1 | 6/2002 |
| KR | 20020047701 | 6/2002 |
| KR | 20020047701 A | 6/2002 |
| KR | 20020051552 A | 6/2002 |
| KR | 20020055484 A | 7/2002 |
| KR | 20020056854 A | 7/2002 |
| KR | 20030012681 A | 2/2003 |
| KR | 20030015573 A | 2/2003 |
| KR | 20030064186 A | 7/2003 |
| KR | 100493805 B1 | 9/2003 |
| KR | 20030075851 A | 9/2003 |
| KR | 20040013370 A | 2/2004 |
| KR | 20040037289 A | 5/2004 |
| KR | 20040054449 A | 6/2004 |
| KR | 20040059103 A | 7/2004 |
| KR | 20070066441 A | 6/2007 |
| WO | WO9834203 | 8/1998 |
| WO | WO9908238 | 2/1999 |
| WO | WO0150305 | 7/2001 |
| WO | WO0209308 | 1/2002 |
| WO | WO0211019 | 2/2002 |
| WO | WO0221354 A1 | 3/2002 |
| WO | WO-02/45424 | 6/2002 |
| WO | WO-02-101457 | 12/2002 |
| WO | WO03049364 | 6/2003 |
| WO | WO98/34203 | 12/2004 |
| WO | WO2006009460 A1 | 1/2006 |

\* cited by examiner

METHOD AND SYSTEM FOR IMPROVING CLIENT SERVER TRANSMISSION OVER FADING CHANNEL WITH WIRELESS LOCATION AND AUTHENTICATION TECHNOLOGY VIA ELECTROMAGNETIC RADIATION

CROSS REFERENCE TO RELATED APPLICATIONS

This application is a continuation of previously filed U.S. application Ser. No. 13/573,418 which is a continuation of U.S. Pat. No. 8,285,211 which is a continuation of U.S. Pat. No. 7,983,616 which is a continuation of U.S. Pat. No. 7,647,024, filed Oct. 2, 2006, which claims the benefit under 35 U.S.C. §119 of previously filed provisional patent application Ser. No. 60/722,444, entitled "Online Method and System for International Tourism Business" and filed on Oct. 3, 2005, and also claims the benefit under 35 U.S.C. §119 of previously filed provisional patent application Ser. No. 60/787,510, entitled "Intelligent Kiosk for Mobile Payment" and filed on Mar. 31, 2006, and also claims the benefit under 35 U.S.C. §119 of previously filed provisional patent application Ser. No. 60/832,962, entitled "Method and System for Global Telecommunication Transactions" and filed on Jul. 25, 2006. The entire contents of these applications are hereby incorporated by reference in their entirety.

BACKGROUND OF THE INVENTION

1. Field of the Invention

This invention relates generally wireless communication security, and more particularly to a method and system for facilitating electronic communication of secure information.

2. Description of the Related Art

Wireless communication and network technologies have advanced with an accelerating rate. How to integrate, apply, improve, and manage wireless communication and computer server technology advancement in industry and economic development always remains a challenge.

Although network communication has become prevalent in people's lives, how to enable secure data transmission in the global context with wireless terminals presents another area of need.

SUMMARY OF THE INVENTION

The applications of part or all the embodiments of present invention provide improvement of secure data communication in industry and business. The potential increased efficiency and profits generated are sustained by integrated information across industry sectors, time, and networks.

By improving wireless communication security technology and integrating wireless communication with remote server functionality, this invention provides a method and system to advance security and efficiency of data communication. The invented method and system have valuable applications in sectors of servers and computer software, logistics, telecommunications, global trade, etc.

BRIEF DESCRIPTION OF THE DRAWINGS

The figures depict, in highly simplified schematic form, embodiments reflecting the principles of the invention. Many items and details that will be readily understood by one familiar with this field have been omitted so as to avoid obscuring the invention. In the drawings.

DETAILED DESCRIPTION

The invention will now be taught using various exemplary embodiments. It will be appreciated that the invention is not limited to just these embodiments. It is and will be apparent to one skilled in the art that these specific details are not required in order to practice the present invention.

Figure 1:
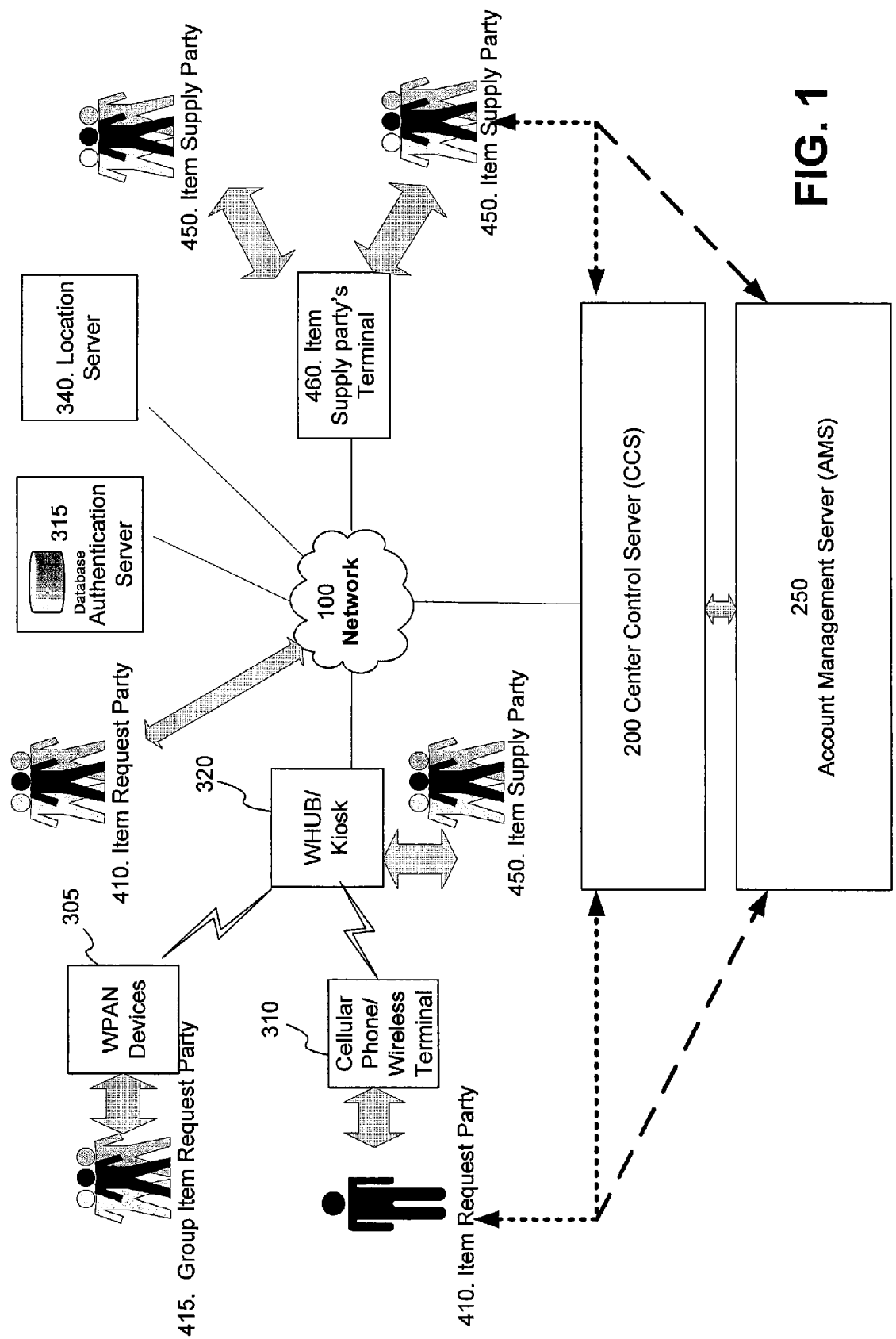
FIG. 1 is a schematic diagram illustrating the architecture of an example of a system in accordance with the present invention.

FIG. 1 illustrates an example of a system architecture in accordance with the present invention. The system includes Center Control Server 200, which is connected to a wireless HUB 320, Authentication Server 330, Location server 340, Account Management Server 250, and user terminal(s) 460 through a network 100, such as the Internet. The wireless HUB 320, along with Authentication Server 330, authenticates user's identification through a short range Electromagnetic (EM) radiation and provides the user with access to secure data communication with a wireless terminal such as a cellular phone or a PDA. The Center Control Server 200, through various functional modules, manages the data flow and coordinates the functions of the servers and user terminals. User location information is sent from the Location Server 340 and processed to initiate, accelerate, and optimize the flow of information and corresponding processes.

Various aspects described herein may be embodied as systems, methods or computer programs. Computer program embodiments may be stored on a computer readable medium such as a magnetic disk, optical disk, non-volatile memory, or other tangible computer readable media. Such computer programs variously include program instructions that are executable by a processor to perform operations comprising those described in detail herein.

One aspect of the invention implements a cellular network, a wireless personal area network (WPAN) and wireless identification technology. Various technologies are applicable to this aspect of the invention, including but not limited to 3G technology for the cellular network; Zigbee, Bluetooth, or UWB technologies for the WPAN; and RFID (e.g., NFC) for the wireless identification technology.

The present invention facilitates secure data transmission through the wireless HUB 320. The wireless HUB 320 first receives and recognizes a unique identifier corresponding to a mobile terminal through a wireless connection. Once this authentication is processed, the wireless HUB 320 establishes a communication channel with the user terminal for secure data transmission. The data is routed via the secure communication channel to the Center Control Server 200 and processed by the function modules.

Figure 3:
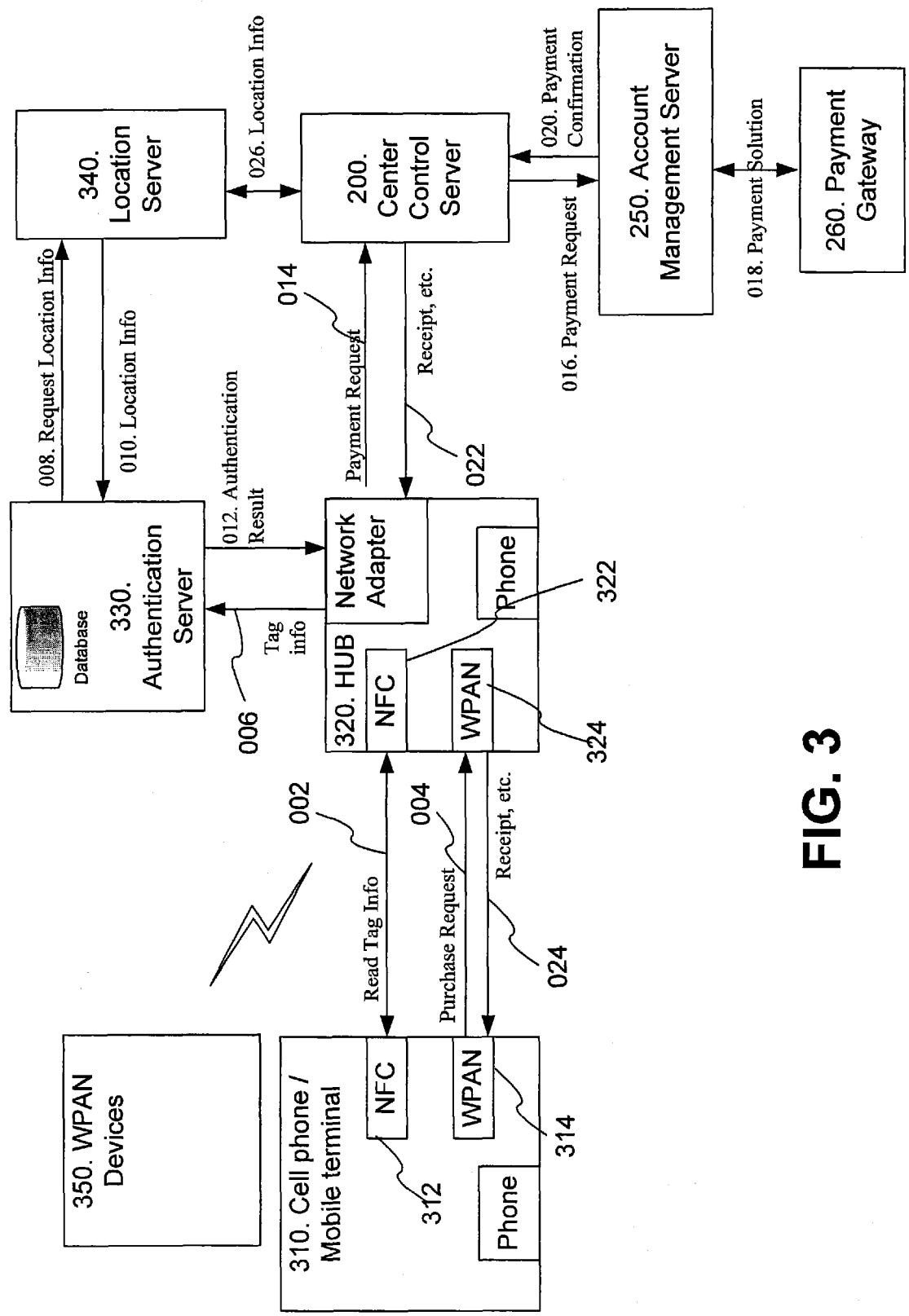
FIG. 3 is a block diagram illustrating an example of a wireless communication structure of a system in accordance with the present invention.

FIG. 3 illustrates and provides a system process in accordance with this aspect of the invention. In FIG. 3, the secure communication channel is separate from the short range wireless connection used to receive the unique identifier in order to achieve a greater bandwidth. Alternatively, the authentication and data transmission upon the completion of the authentication can share a wireless communication channel.

The wireless HUB (WHUB) 320 is located in a public or private location. For a public location, the WHUB 320 is preferably housed in a kiosk. The kiosk may be located on a street, or in an airport, shopping mall, or any location that is perceived as convenient and likely to include user traffic. For private locations, the WHUB 320 is preferably configured for usage in locations like homes or hotel rooms. In these environments, the WHUB 320 may be provided in a smaller device such as part of a Set Top Box (STB).

The handset 310 is equipped with a tag that provides a unique identifier that can be wirelessly communicated to the WHUB 320. A preferred tag is a Near Field Communication (NFC) tag 312. NFC provides short-range wireless connectivity via EM radiation that uses magnetic field induction to enable communication between the devices. It has a short range of a few centimeters, which is believed to provide security advantages for applications of this aspect of the present invention. Although NFC is preferred, RFID or other substitutes can also be provided. The handset 310 also includes a WPAN transceiver 314, which allows an additional communication channel between the handset and the WHUB.

The wireless WHUB 320 is similarly equipped with an NFC reader 322, a WPAN transceiver 324 and a network adaptor 326. The NFC technology accommodates secure and automatic authentication and data exchange between the NFC tag and NFC reader.

Figure 4A:
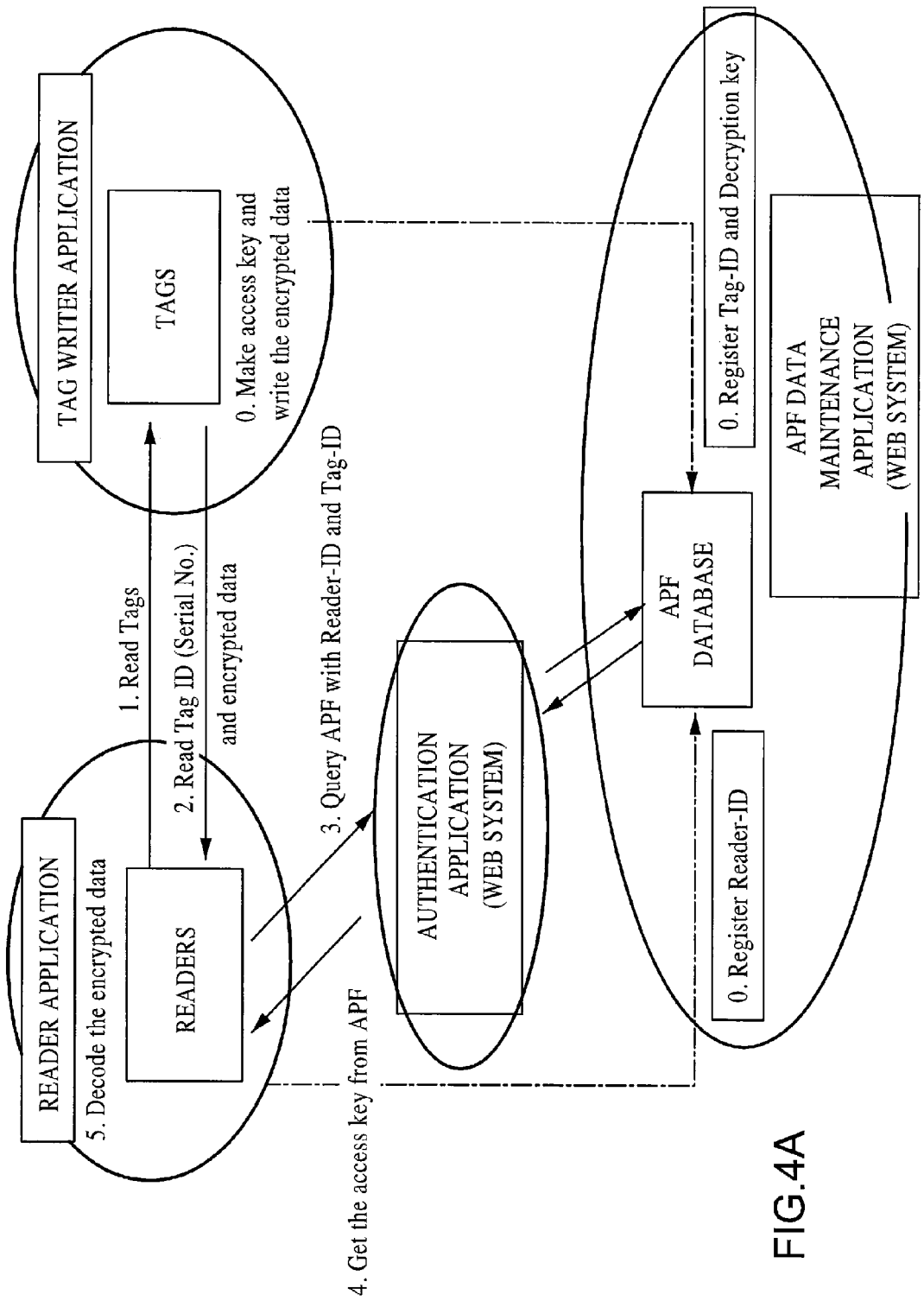
FIGS. 4A-B are schematic diagrams illustrating an example of an authentication process in accordance with the present invention.
Figure 4B:
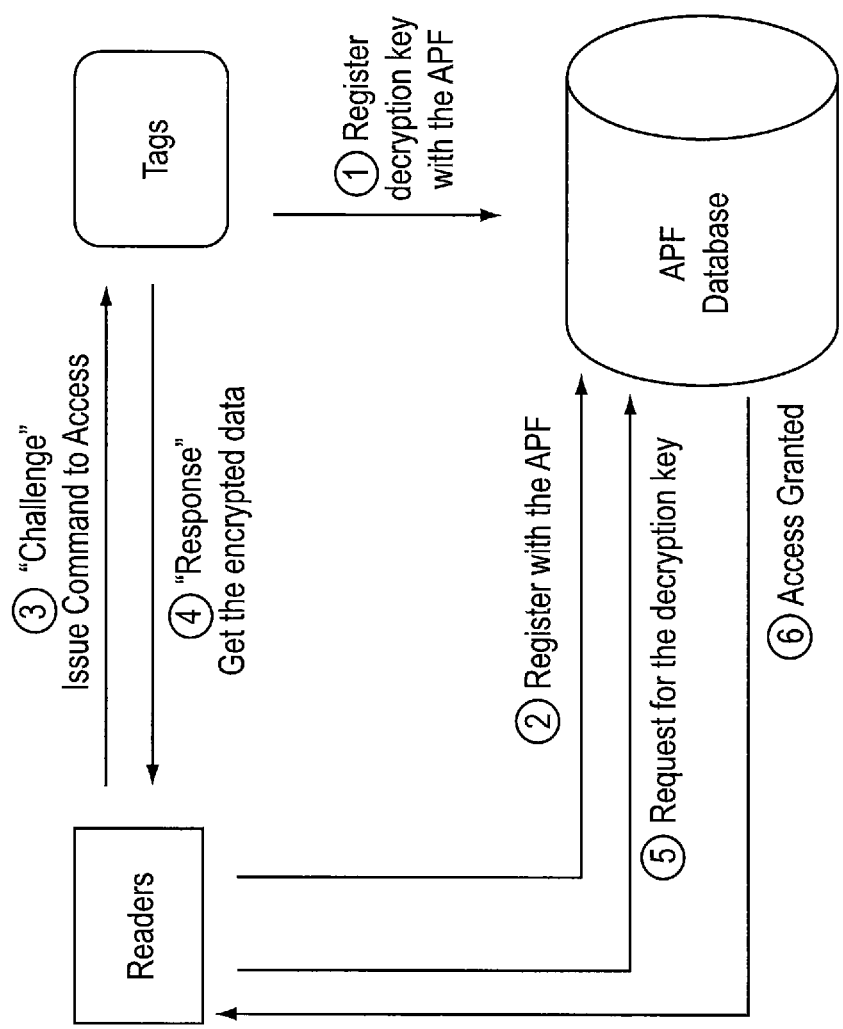

The process of authentication may be based upon a Tag ID and password 002. The Tag ID and password 006 are sent to the authentication server, which then returns a notification 012 confirming authentication. Preferably, this authentication indicates whether the individual is who he or she claims to be, but does not address the access rights of the individual. The authentication server may reside within or outside the WHUB 320. The authentication processes are further illustrated in FIGS. 4A-B.

The communication through the separate secure communication channel (e.g., WPAN) is then established upon the completion of authentication. The WPAN functionality is used to communicate between the handset and the WHUB, so that content related to a requested action may be securely exchanged. In this example, the requested action is a purchase request 004.

According to one aspect of the present invention, the NFC is uniquely associated with other information that allows an appropriate action (payment, alert, etc.) to take place. For example, when the system is being used to accommodate mobile payment, the RFID tag can be associated with the user's bank account. Further, both the WHUB 320 and wireless handset/terminal 310 are authorized by the Authentication Server 330. Once the devices are authenticated (i.e., the WHUB is a genuine WHUB), a second secure communication channel with more capabilities is established between the handset 310 and WHUB 320. This allows the action request and transaction information to be reliably transmitted between the two devices. Once the user's terminal 310 is associated with the user's bank account, the WHUB 320 can perform the functions of an ATM for the user to manage his bank account (e.g., depositing or withdrawing money from the user's bank account).

A communication of the second secure wireless connection or both wireless connections can implement a WPAN transceiver, which has a higher data rate and longer operational range compared to NFC. The secure communication can be implemented by hardware (e.g., a dedicated hardware chipset) and software (e.g., data encryption algorithm). The secure communication allows the exchange of transaction process information such as price and credit card information for a purchase request and bidding proposals among transaction parties. It is also noted that the WHUB 320 is optionally configured with a wireless communication capability such as cellular network communication. The WHUB 320 is also preferably configured to operate with a system that delivers Internet content.

The WHUB 320 can also exchange data with other WPAN devices 350, and the WPAN can include NFC functions for authentication purposes.

The NFC communication system used in this invention is an inductively coupled RFID system. Its working frequency is designed to utilize either low frequency (LF) 125 kHz or high frequency (HF) 13.56 MHz, due to the fact that higher usable field strengths can be achieved in the operating range of the reader (e.g., 0-10 cm) in a lower frequency band than would be the case in a higher frequency band.

Figure 4C:
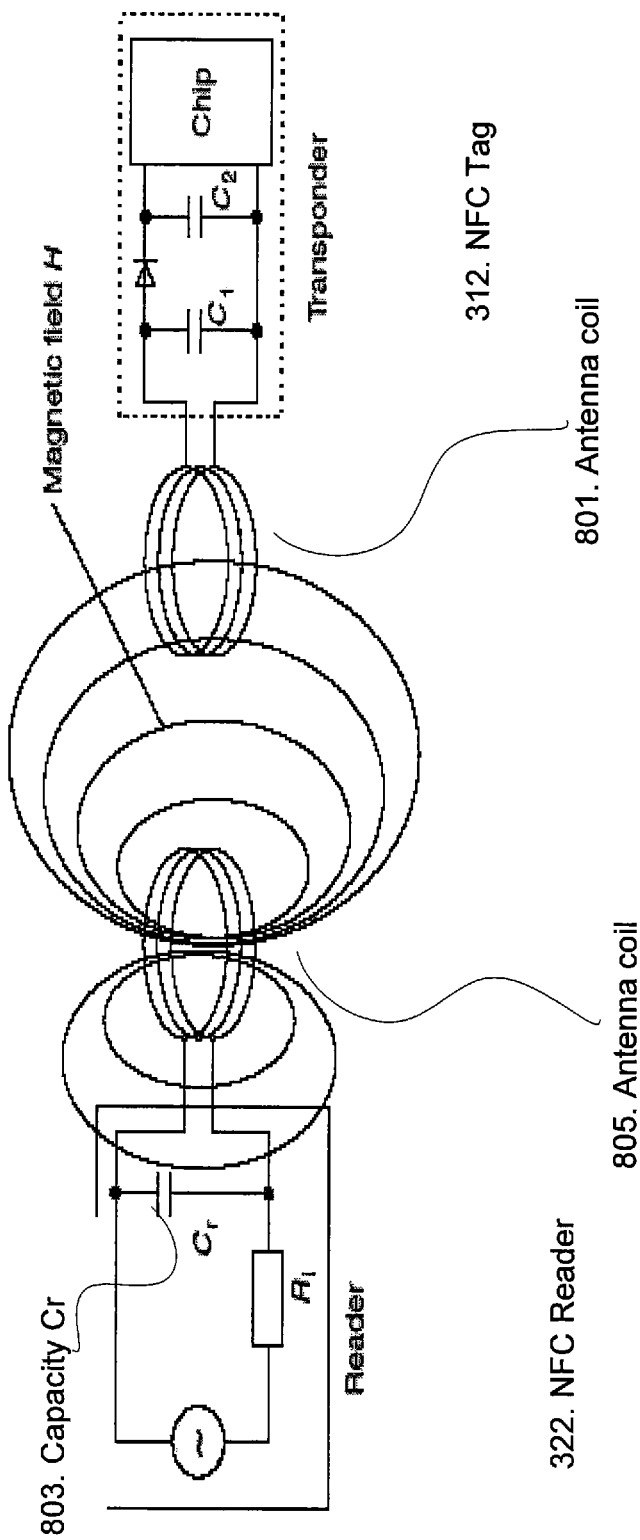
FIG. 4C is a schematic diagram illustrating an example of an NFC communication system in accordance with the present invention.

Due to the short distance between the reader and NFC tag, this NFC system employ inductive coupling for data transmission. All the energy needed for the operation of the NFC tag 322 has to be provided by the NFC reader 312 (FIG. 4C). For this purpose, the reader's antenna coil generates a strong, high frequency electromagnetic field, which penetrates the cross-section of the coil area and the area around the coil. Because the wavelength of the frequency range used (125 kHz: 2400 m, 13.56 MHz: 22.1 m) is several times greater than the distance between the NFC reader's antenna and the NFC tag, the electromagnetic field may be treated as a simple magnetic alternating field with regard to the distance between NFC tag and antenna.

NFC uses magnetic field induction to enable communication between devices when they're touched together, or brought within a few centimeters of each other. The energy and wave transmission are based on Maxwell's equation $$\begin{cases} \dfrac{\nabla \times B}{\mu} = j + \dfrac{\partial D}{\partial t} \\ \nabla \times E = -\dfrac{\partial B}{\partial t} \\ \nabla \times E = 0 \end{cases} \quad (1)$$

where B is the magnetic induction, E is the electric field, D is the electric displacement, and H is the magnetic field. The definition for cur $\nabla \times A$ is $$\nabla \times A = \left(\dfrac{\partial A_z}{\partial y} - \dfrac{\partial A_y}{\partial z}\right)\vec{x} + \left(\dfrac{\partial A_x}{\partial z} - \dfrac{\partial A_z}{\partial x}\right)\vec{y} + \left(\dfrac{\partial A_y}{\partial x} - \dfrac{\partial A_x}{\partial y}\right)\vec{z} \quad (2)$$

A plane electric wave travel in the horizontal ("x") direction space is represented as $$\dfrac{\partial^2 E}{\partial x^2} = \dfrac{1}{c^2}\dfrac{\partial^2 E}{\partial t^2}$$

where c is the speed of light. The same form can be applied to magnetic field wave in a place perpendicular the electrical field. Both E&B field are perpendicular to the travel direction x:

$$E=E_m \sin(kx-\omega t)$$

$$B=B_m \sin(kx-\omega x) \quad (3)$$

The WHUB 320 communicates with Location Server 340 for the mobile terminal 310 location. The Location Server 340 may detect the mobile terminal 310 location using various techniques such as Time Difference of Arrival (TDOA), Received Signal Strength Indication (RSSI), GPS/AGPS, and cellular tower. The location information is used to promote merchandise trading and accelerate and optimize the transaction process. The user location information can be further used for security purposes. For example, a user detected at location A may be declined to a request for a cash advance or withdrawal that is made from a WHUB 320 that is actually at a different location B.

Received signal strength indication (RSSI) based location mechanism is typically used in the environment where the density of fixed reference signal sources (such as cell tower, access points) is high. The transmitting power of a reference signal source is denoted as $P_t$, and the distance between the reference signal source and the mobile device is d. The RSSI can be calculated as follows:

$$P_r = P_t - 20 \log_{10}(4\pi f/c) - 20 \log_{10} d \quad (4)$$

where f is the RF frequency.

The RSSI based location mechanism constitutes two steps: 1) site survey to generate radio map and 2) table looking based location estimation. In step 1, a radio map is generated via either manual site survey or some automotive software algorithm. The radio contains list of positions with correlated RSSI values. After a radio map is generated, the location of a mobile device is estimated by comparing the instant RSSI from different reference signal sources with the radio map. The location in the radio map with the RSSI data that match the current RSSI data will be considered as the mobile terminal's location.

Another position tracking method that may be used to provide the location information to the Location Server 340 would typically involve a mobile user who is operating on an OFDM wireless communication system. The OFDM system is one of the modulation schemes for next generation wireless communication systems. An OFDM system with N sub-carriers employs M-ary digital modulation, a block of $\log_2 M$ input bits is mapped into a symbol constellation point $d_k$ by a data encoder, and then N symbols are transferred by the serial-to-parallel converter (S/P). If T denotes the symbol interval, the symbol interval in the OFDM system is increased to NT, which makes the system more robust against the channel delay spread. Each sub-channel, however, transmits at a much lower bit rate of $$\log_2 \frac{M}{NT} \text{bits/s}.$$

The parallel symbols $(d_0\ d_1\ \ldots\ d_k\ \ldots\ d_{N-1})$ modulate a group of orthogonal sub-carriers, which satisfy $$\frac{1}{NT}\int_0^{NT} \exp(j2\pi f_i t) \cdot \exp(j2\pi f_j t)\,dt = \begin{cases} 1 & i=j \\ 0 & i \ne j \end{cases} \quad (5)$$

where $$f_i = \frac{i}{NT}, \quad (i=0, 1 \ldots, N-1)$$

The baseband transmitted signal can be represented as $$s(t) = \frac{1}{\sqrt{NT}} \sum_{k=0}^{N-1} s_k e^{j2\pi f_k t} \quad (6)$$

$$(0 \le t \le NT)$$

$$f_k = \frac{k}{NT}$$

The average energy for the complex baseband symbol $s_k$ is denoted by $2E_s$. Then $s_k$ is given by:

$$s_k = \sqrt{2E_s} \cdot d_k \quad (7)$$

where $d_k = d_{k,r} + j\,d_{k,i}$, is the signal constellation point (e.g. BPSK, QPSK, QAM, etc.) with normalized variance $E[|d_k|^2]=1$. The real and imaginary parts $d_{k,r}$ and $d_{k,i}$ are statistically independent, identically distributed and $E[d_{k,r}]=E[d_{k,i}]=0$.

A command frequency selective randomly varying channel with impulse response $h(t, \tau)$ is considered. Within the narrower bandwidth of each sub-carrier, compared with the coherence bandwidth of the channel, the sub-channel is modeled as a frequency nonselective Rayleigh fading channel. Hence, the channel impulse response $h_k(t, \tau)$ for the $k^{th}$ subchannel is denoted as $$h_k(t,\tau) = \beta_k(t) \cdot \delta(\tau) \quad (8)$$

where $\beta_k(t)$ is a stationary, zero mean complex-valued process described as follows. It is assumed that the processes $\beta_k(t), k=1, \ldots, N$, are complex-valued jointly stationary and jointly Gaussian with zero mean and covariance function $$R_{\beta_k \beta_l}(\tau) = E[\beta_k(t+\tau)\beta^*_l(t)], k,l=0, \ldots, N-1. \quad (9)$$

For each fixed k, the real and imaginary parts of the process $\beta_k(t)$ are assumed independent with identical covariance function. Further assumed is the factorable form $$R_{\beta_k \beta_l}(\tau) = R_1(\tau) R_2(k-l), \quad (10)$$

with $R_1(\tau)$ and $R_2(k-l)$ specified below. $R_1(\tau)$ gives the temporal correlation for the process $\beta_k(t)$ which is seen to be identical for all $k=0, \ldots, N-1$. $R_2(k-l)$ represents the correlation in frequency across subcarriers. In this circumstance it is assumed that the corresponding spectral density $\Psi_1(f)$ to $R_1(\tau)$ is given by the Doppler power spectrum, modeled as Jakes model, i.e., $$D(f) = \begin{cases} \dfrac{1}{\pi F_d \cdot \sqrt{1-\left(\dfrac{f}{F_d}\right)^2}} & |f| \le F_d \\ 0 & \text{otherwise} \end{cases} \quad (11)$$

where $F_d$ is the (maximum) Doppler bandwidth. Note that $$R_1(\tau) = J_0(2\pi F_D \tau) \quad (12)$$

where $J_0(\tau)$ is the zero-order Bessel function of the first kind. In order to specify the correlation in frequency across subcarriers, an exponential multipath power intensity of the form $$S(\tau) = \alpha e^{-\alpha \tau}, \tau > 0, \alpha > 0 \quad (13)$$

is adopted, where α is a parameter that controls the coherence bandwidth of the channel. The Fourier transform of S(τ) yields $$\psi_2(f) = \frac{\alpha}{\alpha + j2\pi f} \quad (14)$$

which provides a measure of the correlation of the fading across the subcarriers. Then $$R_2(k-l) = \psi_2(\Delta f(k,l)) \quad (15)$$

where Δf=1/NT is the frequency separation between two adjacent subcarriers. The 3 dB bandwidth of $\Psi_2$(f) is defined as the coherence bandwidth of the channel and easily shown to be $f_{coherence} = \sqrt{3}\alpha/2\pi$. This model is applicable to many practical wireless OFDM systems and physical channel scenario.

The given value of the first arrived path $t_0$ and noise vector n are both zero mean random variable with probability density function represent as $$p(s|t_0) = \frac{1}{\text{Det}(Z_s)\pi^N} \exp(-s^* Z_s^{-1} s) \quad (16)$$

The value $t_0$ is obtained by applying ML when equation (16) is maximized. Therefore, the location of the mobile user is estimated based upon the value of $t_0$.

According to one aspect of the invention, the financial transaction may or may not immediately follow authentication. The cellular phone may be configured to include browsing capability, which allows the cellular phone to be used to communicate with merchants prior to making a purchase request. Internet content can also be accessed by the cellular phone in association with a transaction request.

Also, the cellular phone may access Internet content through methods other than through the WHUB.

Various purchase types may be made with the purchase request. Examples may include a physical item that is separately shipped to an address, a download that is made available immediately, possibly to the cellular phone, a service, etc.

It is also noted that a purchase request is just one form of an action that may be carried out. Other business or financial transaction information processed by the system include but are not limited to bill payment, populating an account with funds, online shopping transactions, dynamic and reverse bidding, and others.

As necessary, additional information may also be required in association with a requested action. For example, account identification information or passwords to access an account for the transaction parties hosted by the system or an external server may be required. In these circumstances, the Account Management Server 250 sends a request to the WHUB for the information. The WHUB may store such information and respond to such a request. Alternatively, the WHUB may further exchange information with the user (through the handset), in order to obtain the additional information requested.

In connection with the purchase request 004, a payment request 014 is made between the WHUB 320 and Account Management Server 250 through the network connection. The payment request 014 allows the user to complete the transaction related to the purchase request 004. To accommodate a satisfactory completion of the payment request, the Account Management Server 250 corresponds with a payment gateway, and sends a solution 018 indicating the success or failure of the payment request.

Upon an indication of a successful payment request, the WHUB 320 receives a receipt 022 or confirmation number from the Account Management Server relating to the requested action, and passes 024 that and related information to the handset confirming completion of the action. This may be a receipt, confirmation numbers, coupon codes, or the like.

According to another aspect of the invention, Account Management Server (AMS) 250 opens and manages accounts for users. The system users are categorized into two transaction parties: the Item Request Party (IRP) and Item Supply Party (ISP). The ISP's income is remitted instantly or periodically to the ISP's bank account from ISP's account with Account Management Server 250. This solution has unique advantage for cross-border financial transactions, particularly, for those countries that don't have compatible credit card payment infrastructure across borders.

Figure 5:
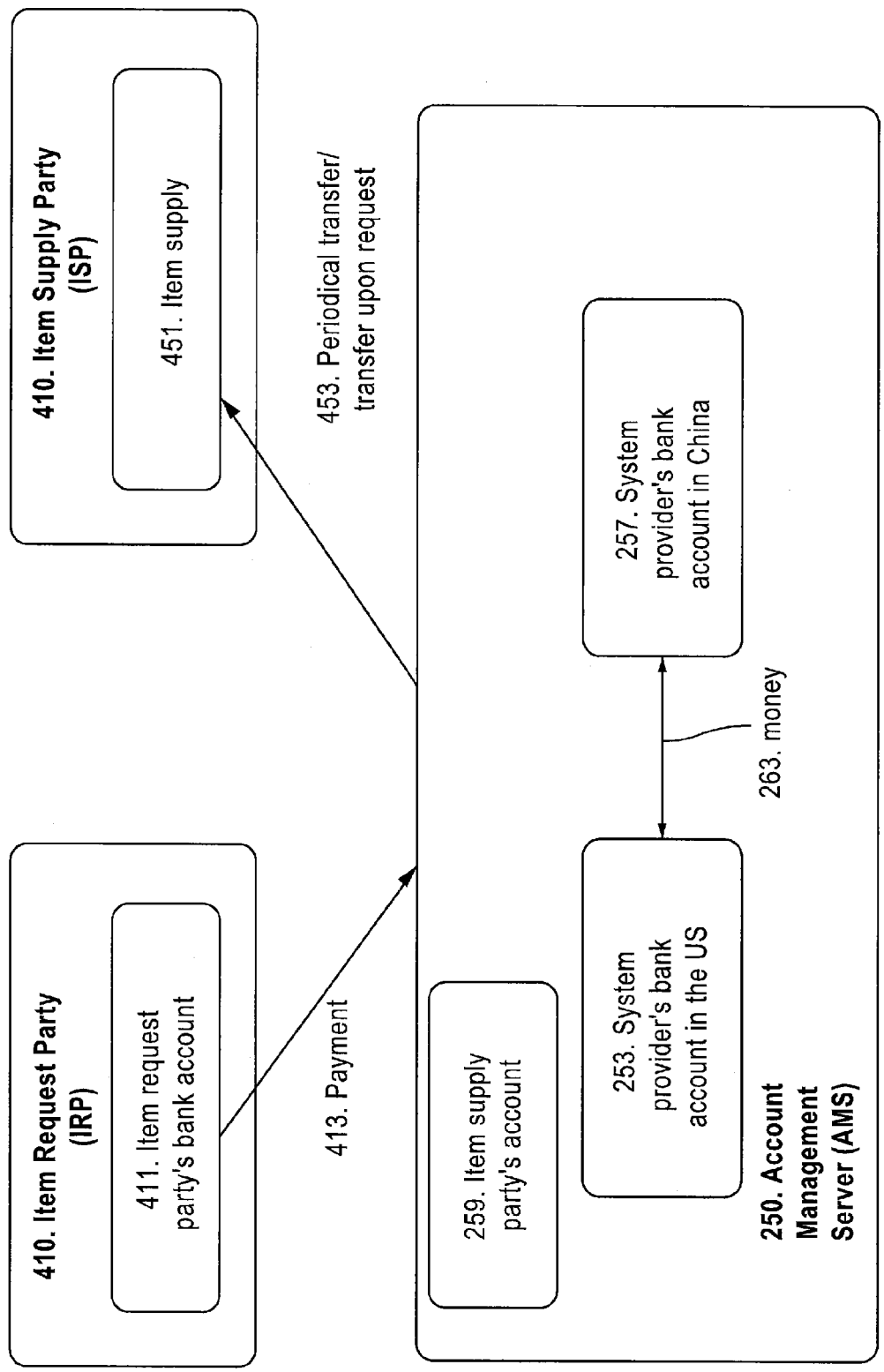
FIG. 5 is a block diagram illustrating an Account Management Server and corresponding functionality.

FIG. 5 illustrates certain functionality of the Account Management Server corresponding to an example of a payment solution for a transaction processed according to one aspect of the present invention. In this example, the IRP 410 is a US tourist who has purchased tourism service package in China from a Chinese travel agency (the ISP 450). The credit payment of the IRP 410 is transmitted 413 to the system provider's bank account in the US 253. The Account Management Server 250 adds the credit to the ISP's account with Account Management Server. The payment to the ISP's bank account in China is transmitted from the system provider's bank account in China 257, e.g. with the Bank of China, as soon as the IRP in the US confirms the purchase. Hence, the charge related to cross border money transmission is avoided for every single international trade and business processed by the system. The accumulated payment in the system provider's bank account at one country can be transmitted to the account at another country periodically. Or the payment from IRPs at country A to ISPs at country B cancels out the payment from IRPs at country B to ISPs at country A so cross country money transmission can be avoided. Further, the system provider may choose the same international bank for its accounts at different countries to reduce the cross border financial transmission fee. This aspect of the present invention not only allows sellers of international business to receive payments promptly, it also benefits the online buyers and sellers with lower transmission fee for international trade and business. In addition, it provides an improved payment solution to the countries without sound credit card operations.

Figure 2:
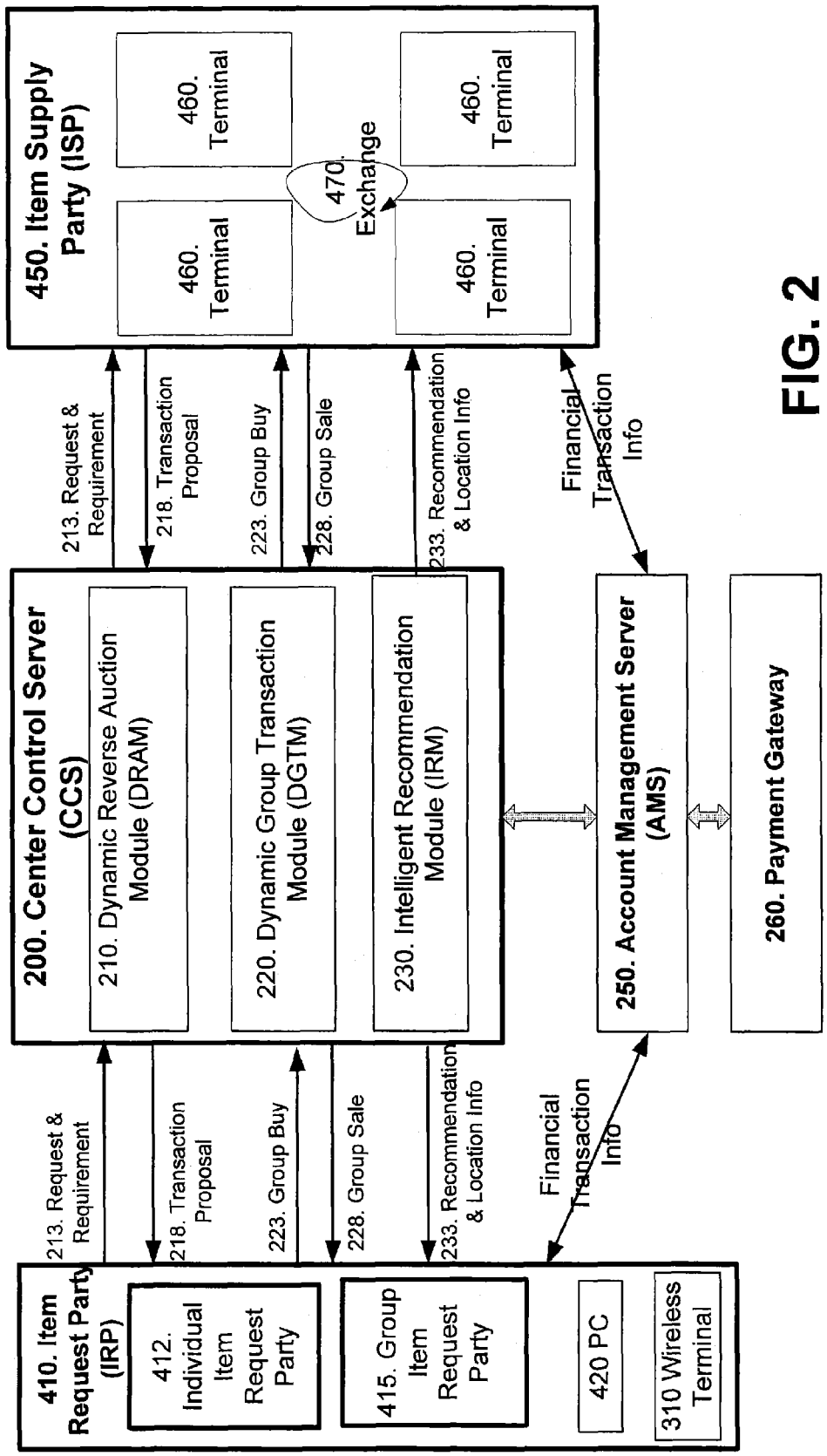
FIG. 2 is a block diagram illustrating an example of Center Control Server Modules in accordance with the present invention.

FIG. 2 is a block diagram illustrating the Center control Server 200 configured to provide an information platform for the information process. In this embodiment, the system provides registered users with user terminals 460, 310 and 420. IRP request information is from Center Control Server to ISPs' terminals according to ISPs' particular needs. Users can access their terminals from a server, a wireless terminal, and the like. Account Management Server 250 manages the payment of the transaction based on the mechanism described in FIG. 5. Intelligent Recommendation Module 230 provides the users with information related to the transaction such as market competition information and transaction parties' credit and location information. Dynamic Reverse Auction Module 210 and Dynamic Group Transaction Module 220 manage the transaction information process.

Figure 6:
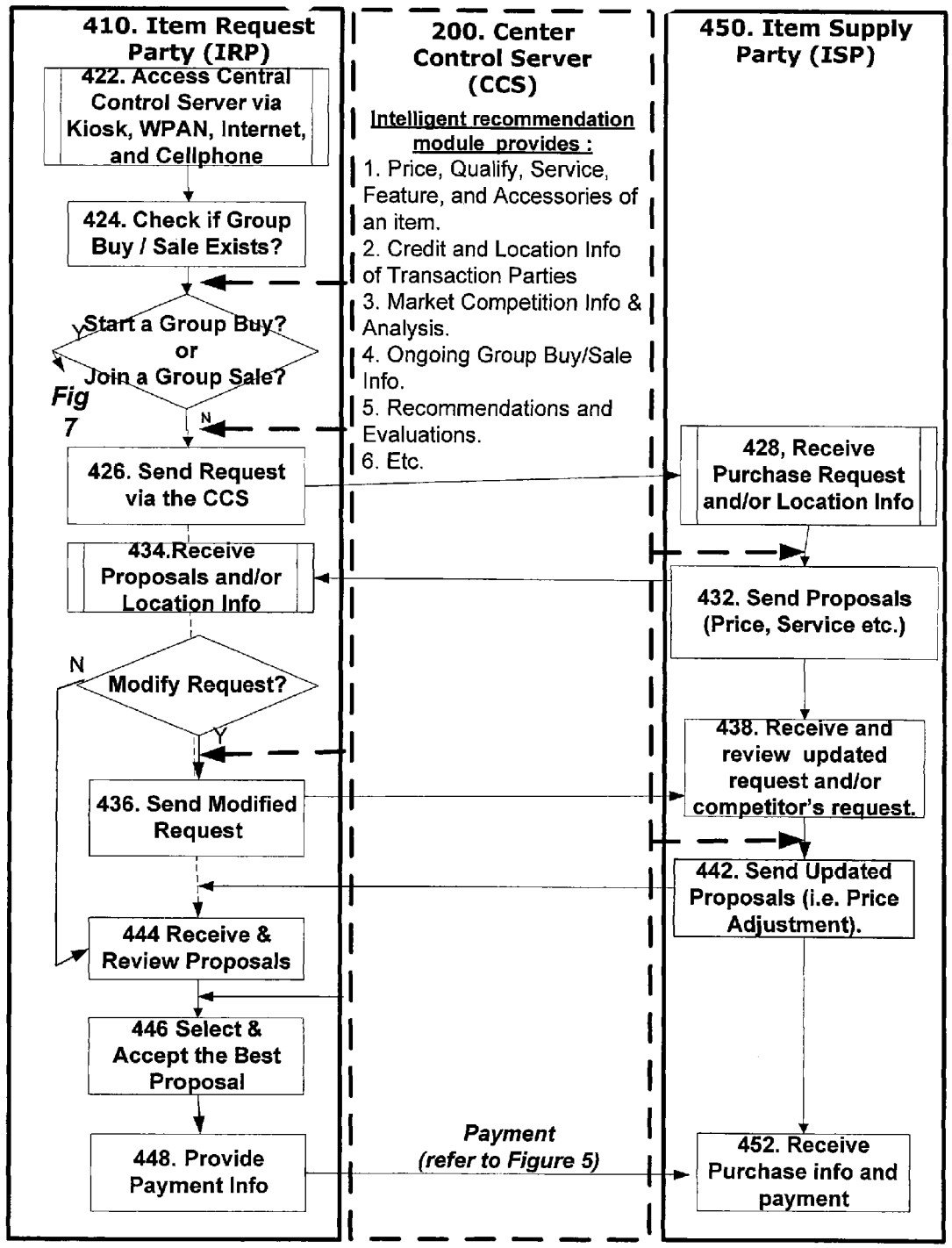
FIGS. 6 and 7 are functional block diagrams illustrating processes in accordance with the present invention.
Figure 7:
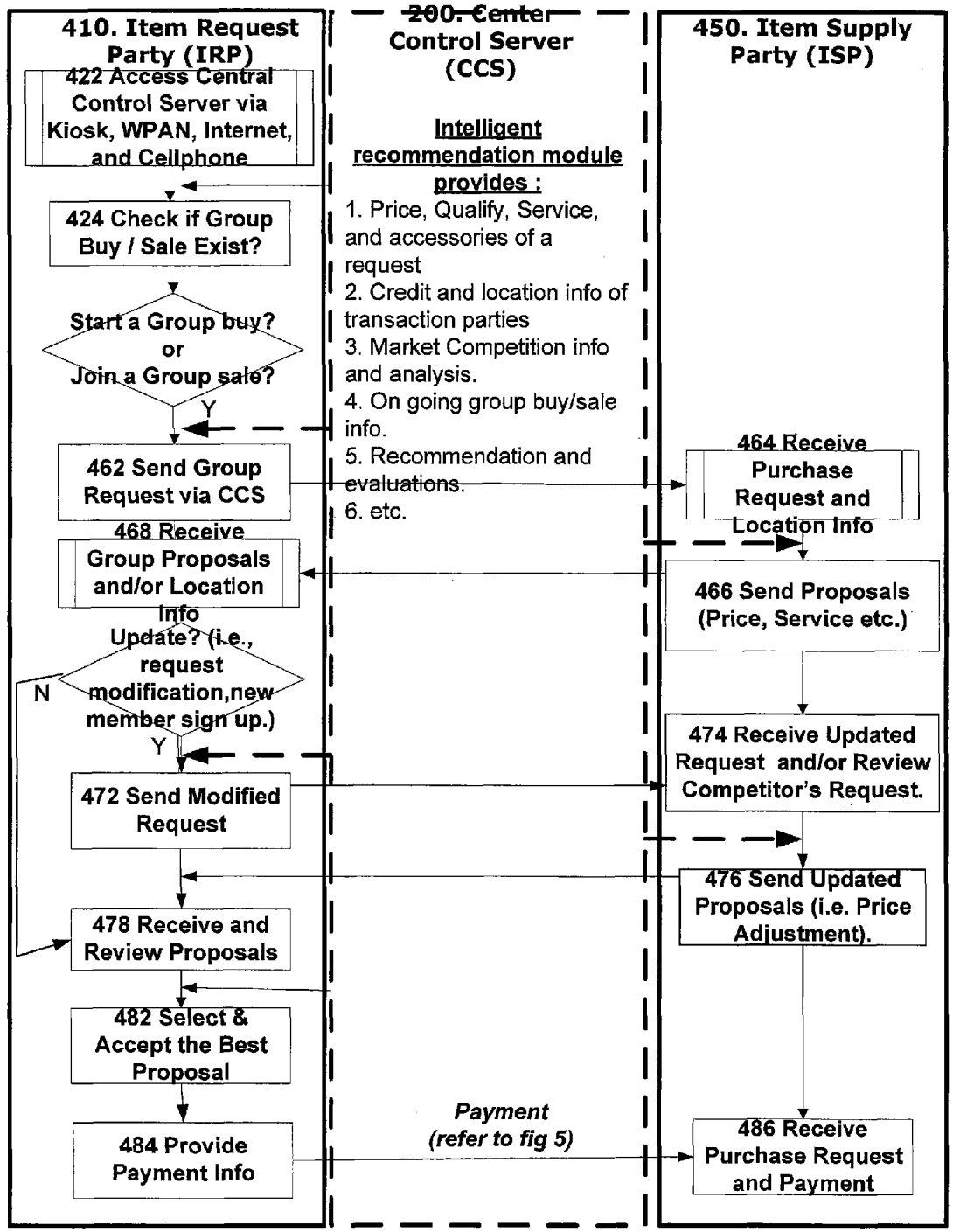
Figure 8:
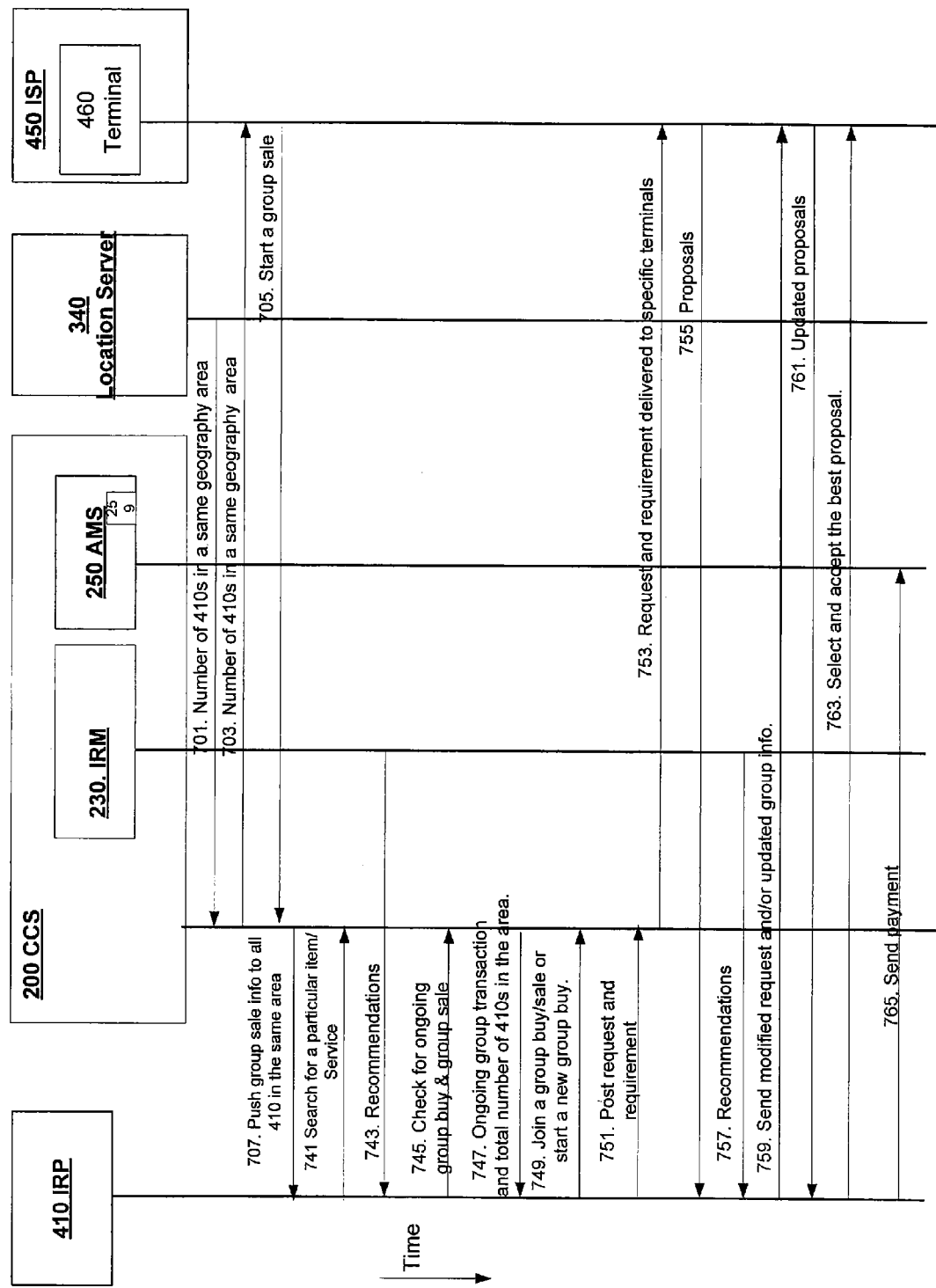
FIG. 8 is an event diagram illustrating an example of information flow in accordance with the present invention.

FIGS. 6 and 7 illustrate an example of information flow among the Item Request Party (IRP) 410, center control server (CCS) 200, Location Server (340), and Item Supply Party (ISP) 450. In the invented system, ISPs bid instead of IRPs. In addition, the IRP leads the bidding process by submitting (step 426) and modifying (step 436) requests and requirements of items or services. The ISPs, at their customized terminals, access IRP's requests (step 428), submit transaction proposal/offers (step 432), and monitor the competitors' proposals and modification of requests in real real time (step 438). The requests and requirements may alter during the process according to the real-time competition information (step 436). During the real time progress of the information process, the Center Control Server (CCS), via Intelligent Recommendation Module (IRM) 230, provides IRPs and ISPs with market competition information pertaining to IRP's requests and ISP's proposals including but not limited to prices from market competitors, quality, accessories of the requested items or services, credit rating and locations of transaction parties, analysis and recommendations, and ongoing bidding activities and group buy/sale negations related with the requests and proposals.

According to another aspect, this present invention facilitates negotiation and competition among transaction parties using user's location information. Center Control Server obtains the location information from Location Server. With the location information of IRP, certain request and requirement are sent only to ISP close to the IRP. Further, the location information of IRP is used to initiate "group buy" request (step 462 in FIG. 7) by IRP within a same geographical location. According to this embodiment, individual IRP with similar demand may organize into groups and negotiate with ISPs collectively. Further, ISP can use the IRP's location information to organize "group sale" by outputting discount group sale information only to the IRP located in a same geographical area via Center Control Server. One application of this invention is in retail industry: retail buyers pay discount price available only for bulk purchase and manufacturers benefit from increased sale, reduced cost and improved operation efficiency.

In the process of transaction information, the formation of group is integrated into the process of ISP's bidding and IRP's request modification. In step 472 in FIG. 7, the variables of group purchase request modified include group formation requirement and information such as the time left before the deal is closed, size of the group, price, quantity, quality, services, and accessories of the item requested, etc. These variables alter simultaneously and continuously and affect the change of each other. The related market competition information and recommendations are sent to the IRPs and ISPs from Center control Server. And the two transaction parties monitor the status of information variables of the competition real time.

This embodiment of the invention significantly improves the static reverse bidding process in applications. The dynamic feature of the negotiation process enables ISPs and IRPs to locate each other most efficiently and effectively eliminating traditional distribution channels and layers of middlemen and bypassing obstacles presented by time and space.

A good application of this aspect of invention is in E-commerce. With the invented process, the buyers buy the most optimum products with the best price based on real time competition among sellers in the global context. Since the buyers themselves define requests and product requirements, sellers are able to target the clientele effectively. In addition, the sellers' benefits are beyond being informed of market demand real time—they are able to update the customers of the latest product information through their terminals.

The location information of the users provided by Location Server can be used to start a "group buy" bidding by IRPs in a same geographical area, e.g. skiers at a ski resort. Furthermore, an IRP can initiate a dynamic reverse auction among ISPs from a designated geographical area. In addition, ISP can select IRPs according to IRPs locations to promote "group sale" products or services. Critically, according to users' location information, the location of the nearby wireless HUBs along with the information of ongoing bidding, negotiation, and group transaction promotion processed by the system are sent to user's terminals. Last but not least, the user's location information is used to authenticate a user and/or restrict his activities in a geographical area such as withdrawing money from some wireless HUBs.

Besides location information, the request and transaction proposals can be sent to ISPs according to other criteria. Exclusive ISP receives information that is blocked to his competitors. Further, ISPs can be categorized into classes for receiving market demand and competition information of varied level of quality and/or at different time interval.

Another embodiment of the invention provides transaction parties to trade by exchanging their products and services without monetary transactions. This embodiment of invention also provides credits or a system currency for circulation among the users.

In another embodiment of the invention, a user's participation of the transactions or programs processed at the system is motivated through system credit or other kind of reward. The system credit is used among system users for trading goods, services. The credit is calculated with a rate, which increases with acceleration based on the participation of the user or the credit accumulated through participation. The rate can also be determined together with other variables such as user's participation of an ongoing promotion or the number of system users referred.

One embodiment of the invention is that an immediate acceptance price for IRP's request is indicated and/or a corresponding deposit is made in an escrow account managed by the Account Management Server. As soon as an ISP propose a transaction that meets the immediate acceptance price, the transaction is confirmed and the deposit is transferred to an ISP's account.

The above applications of the disclosed method and system are merely example of the invention, provided for the sake of completeness and for the education of the reader by way of concrete examples. The invention can be embodied in various forms and applied in different industry sectors. Combinations and sub-combinations of the various embodiments described above will occur to those familiar with this field, without departing from the scope and spirit of the invention. Therefore, the following claims should not be limited to the description of the embodiments or otherwise constrained in any way to the details of implementation.

The invention claimed is:

1. A system configured to facilitate electronic communication of secure information, the system comprising:
    one or more memories that store account identification information of a financial account; wherein the account identification information is associated with a unique identifier, the unique identifier being associated to a mobile terminal;
    at least one input interface configured to receive the unique identifier and a payment request for a transaction, information of the unique identifier and the payment request having been sent in a short range electromagnetic radiation communication through a short range wireless connection by the mobile terminal, the associated account identification information of the financial account being excluded in the short range electromagnetic radiation communication; and at least one output interface configured to send, in connection with recognition; by the system; of the unique identifier, and identification; by the system of the associated account identification information of the financial account based on the recognized unique identifier, the associated account identification information of the financial account to accommodate a completion of processing the payment request with the associated account identification information of the financial account, the associated account identification information being sent through a network connection, the recognition of the unique identifier corresponding to registered information of the unique identifier, wherein the short range wireless connection is a short range electromagnetic radiation communication connection, the short range electromagnetic radiation communication connection being separate from the network connection through which the account identification information is sent from the at least one output interface;

wherein the short range wireless connection is a near field communication (NFC) channel; and wherein the mobile terminal is a cellular phone.

2. The system of claim 1, wherein the short range electromagnetic radiation communication comprises encrypted data.

3. The system of claim 2, wherein the encrypted data is decrypted in connection with the recognition of the unique identifier.

4. The system of claim 2, wherein the information of the unique identifier sent in the short range electromagnetic radiation communication is encrypted.

5. The system of claim 1, wherein commercial information related with the payment request is sent to the mobile terminal; and wherein the commercial information is related to location information of the mobile terminal.

6. The system of claim 1, wherein a reward is provided for participating in the transaction, the financial account being a reward account.

7. The system of claim 5, wherein the location of the mobile terminal is determined with at least one of:
cellular/GPS location information;
IP address information;
Time Difference of Arrival (TDOA);
Direction Difference of Arrival (DDOA);
ZIP code;
Received Signal Strength Indication (RSSI); and
profile information provided by a user of the mobile terminal.

8. The system of claim 1, wherein the financial account is a credit card account.

9. The system of claim 1, wherein the financial account is a bank account.

10. The system of claim 1, wherein the network connection comprises a dedicated communication channel for payment processing.

11. The system of claim 1, wherein user authentication information is associated with the mobile terminal and used for authentication of a user of the mobile terminal prior to the payment request having been sent in the short range electromagnetic radiation communication.

12. The system of claim 1, wherein the payment request is for a group transaction with a group discount for participation.

13. The system of claim 1, wherein location information of the mobile terminal is used for authentication of a user of the mobile terminal.

14. The system of claim 1, wherein the payment request is sent through a TV set top box.

15. The system of claim 1 further comprising:
a database configured to store the registered information about the unique identifier associated to the account identification information of the financial account.

16. The system of claim 15, wherein commercial information related with the transaction is sent to the mobile terminal; the commercial information is sent to the mobile terminal through a cellular network communication channel, the cellular network communication channel being separate from the network connection and separate from the short range wireless connection.

17. The system of claim 4, wherein the financial account is a reward account wherein a reward is provided for participating in the transaction.

18. The system of claim 11, wherein confirmation information about the completion of the processing of the payment request is communicated to the mobile terminal through a cellular network communication channel, the cellular network communication channel being separate from the network connection and separate from the short range wireless connection.

19. The system of claim 16, wherein confirmation information about the completion of the processing of the payment request is sent through the cellular network communication channel.

20. A mobile terminal configured to facilitate processing of a payment request with a financial account, account identification information of the financial account being communicated through a network connection, the mobile terminal comprising:
an identification element for retaining information of a unique identifier;
a processor; and
one or more memories configured to store program code that includes instructions executable by said processor, said instructions comprising:
sending information of the payment request and the information of the unique identifier in a short range electromagnetic radiation communication over a short range wireless connection to accommodate a completion of processing the payment request with the account identification information of the financial account, the short range electromagnetic radiation communication comprising encrypted data, and the account identification information of the financial account being associated to the unique identifier and being excluded in the short range electromagnetic radiation communication; and
receiving confirmation information regarding a completion of the processing of the payment request,
wherein the short range wireless connection is a short range electromagnetic radiation communication channel, the short range electromagnetic radiation communication channel being separate from the network connection;
wherein the short range electromagnetic radiation communication comprises encrypted data;
wherein the short range wireless connection is a near field communication (NFC) channel; and
wherein the mobile terminal is a cellular phone.

21. The mobile terminal of claim 20, wherein the information of the unique identifier is encrypted.

22. The mobile terminal of claim 20, wherein the confirmation information is received through a cellular network communication channel, the cellular network communication channel being separate from the network connection and separate from the short range wireless connection.

23. The mobile terminal of claim 20, wherein the financial account is a reward account, a reward being provided for participating in a transaction initiated by the payment request.

24. The mobile terminal of claim 20, wherein commercial information related with the payment request is received by the mobile terminal through a cellular network communication channel; and the commercial information is related to location of the mobile terminal.

25. The mobile terminal of claim 20, wherein user authentication information is associated with the mobile terminal and used for authentication of a user of the mobile terminal prior to the sending of the payment request.

26. The mobile terminal of claim 20, wherein the payment request is for a group transaction with a group discount for participation.

27. The mobile terminal of claim 21, wherein the financial account is a credit card account.

28. The mobile terminal of claim of 22, wherein commercial information related with the payment request is received by the mobile terminal through the cellular network communication channel; and the commercial information is related to location information of the mobile terminal.

29. A system configured to facilitate electronic communication of secure information, the system comprising:
one or more memories that store account identification information of a financial account; wherein the account identification information is associated to a unique identifier, the unique identifier being associated with a mobile terminal;
at least one input interface configured to receive the unique identifier and a payment request for a transaction, information of the unique identifier and the payment request having been sent in a wireless communication, through a wireless communication network, by the mobile terminal, the associated account identification information of the financial account being excluded in the wireless communication; and
at least one output interface configured to send, in connection with recognition by the system of the unique identifier and identification by the system of the associated account identification information of the financial account based on the recognized unique identifier, the associated account identification information of the financial account to accommodate a completion of processing the payment request with the associated account identification information of the financial account, the associated account identification information of the financial account being sent through a network connection, the recognition of the unique identifier corresponding to registered information of the unique identifier,
wherein the wireless communication network is separate from the network connection through which the associated account identification information of the financial account is sent from the at least one output interface;
wherein the mobile terminal is a cellular phone;
wherein the wireless communication comprises encrypted data, the encrypted data being decrypted during the processing of the payment request;
wherein the wireless communication network comprises a cellular network communication channel;
wherein commercial information related with the payment request is sent to the mobile terminal through the cellular network communication channel, the commercial information being related to location information of the mobile terminal; and
wherein confirmation information based upon the completion of the processing of the payment request is communicated through the cellular network communication channel.

30. The system of claim 29, wherein the system further comprises a database configured to register the unique identifier associated with the account identification information.

31. The system of claim 29, wherein the wireless communication network comprises a local area wireless network, the local area wireless network being separate from the network connection.

32. The system of claim 30, wherein the financial account is a bank account.

33. The system of claim 29, wherein the wireless communication network comprises a Blue-tooth communication channel, the Blue-tooth communication channel being separate from the network connection.

34. The system of claim 29, wherein location information of the mobile terminal is used for authentication of a user of the mobile terminal.

35. The system of claim 29, wherein the financial account is a reward account, a reward being provided for participating in the transaction.

36. The system of claim 29, wherein the network connection comprises a dedicated communication channel for payment processing.

37. The system of claim 29, wherein user authentication information is associated with the mobile terminal and used for authentication of a user of the mobile terminal prior to the payment request having been sent in the wireless communication.

38. The system of claim 30, wherein the payment request is for a group transaction with a group discount for participation.

39. The system of claim 30, wherein the financial account is a credit card account.

40. The system of claim 30, wherein the system further comprising an intelligent recommendation unit, the intelligent recommendation unit is configured to provide information related with the payment request, the information including one or more of the following:
location information of the mobile terminal;
credibility rating of a transaction party;
product or service information and analysis including one or more of price, features, quality, and accessories;
market and competition information and analysis related with the payment request;
information regarding a group transaction wherein a participating party is provided with a group discount;
alert message related with the payment request;
commercial promotion;
communication among transaction parties; and
online status of the communication parties.

41. A mobile terminal configured to facilitate processing of a payment request with a financial account, account identification information of the financial account being communicated through a network connection, the mobile terminal comprising:

an identification element for retaining information of a unique identifier;
a processor; and
one or more memories configured to store program code that includes instructions executable by said processor, said instructions comprising:
sending the information of the unique identifier and the payment request in a wireless communication through a wireless communication network to accommodate completion of processing the payment request with the account identification information of the financial account, the wireless communication comprising encrypted data, and the account identification information of the financial account being associated to the unique identifier and being excluded in the wireless communication; and
receiving confirmation information regarding the completion of the processing of the payment request,
wherein the wireless communication network is separate from the network connection;
wherein the mobile terminal is a cellular phone;
wherein the wireless communication comprises encrypted data;
wherein the wireless communication network comprises a cellular network communication channel, the cellular network communication channel being separate from the network connection;
wherein the mobile terminal is further configured to receive commercial information related to the payment request through the cellular network communication channel, the commercial information being related to location information of the mobile terminal; and
wherein the confirmation information received through the cellular network communication channel.

42. The mobile terminal of claim 41, wherein the wireless communication network comprises a local wireless communication network, the local wireless communication networking being separate from the network connection.

43. The mobile terminal of claim 41, wherein the financial account is a reward account with a reward provided for participation in a transaction initiated by the payment request.

44. The mobile terminal of claim 41, wherein use authentication information is associated with the mobile terminal and used for authentication of a user of the mobile terminal prior to the sending of the payment request.

45. The mobile terminal of claim 41, wherein the wireless communication network comprises a Blue-tooth communication channel, the Blue-tooth communication channel being separate from the network connection.

46. A method for facilitating electronic communication of secure information, the method comprising:
storing registration information about a mobile terminal including a unique identifier associated with the mobile terminal;
storing account identification information of a financial account, the account identification information being associated to the unique identifier;
receiving the unique identifier and a payment request for a transaction, information of the unique identifier and the payment request having been sent in a short range electromagnetic radiation communication through a short range wireless connection by the mobile terminal, the short range electromagnetic radiation communication comprising encrypted data, and the associated account identification information of the financial account being excluded in the short range electromagnetic radiation communication; and
sending, in connection with recognition by the system of the unique identifier and identification by the system of the associated account identification information of the financial account based on the recognized unique identifier, the associated account identification information of the financial account to accommodate a completion of processing the payment request with the associated account identification information of the financial account, the associated account identification information of the financial account being sent through a network connection, and the recognition of the unique identifier corresponding to registered information of the unique identifier,
wherein the short range wireless connection is a short range electromagnetic radiation communication connection, the short range electromagnetic radiation communication connection being separate from the network connection;
wherein confirmation information is communicated based upon the completion of the processing of the payment request;
wherein the short range wireless connection is a near field communication (NFC) channel; and
wherein the mobile terminal is a cellular phone.

47. The method of claim 46, wherein the encrypted data is decrypted in connection with the recognition of the unique identifier.

48. The method of claim 46, wherein the information of the unique identifier is encrypted.

49. The method of claim 48, the information of the unique identifier is stored in an element of the mobile terminal.

50. The method of claim 48, wherein commercial information related with the payment request is sent to the mobile terminal; and wherein the commercial information is related to location information of the mobile terminal.

51. The method of claim 46, wherein a reward is provided for participating in the transaction, the financial account being a reward account.

52. The method of claim 48, wherein the network connection comprises a dedicated communication channel for payment processing.

53. The method of claim 48, wherein the payment request is for a group transaction with a group discount for participation.

54. The method of claim 49, wherein commercial information related with the payment request is sent to the mobile terminal through a cellular network communication channel; and
wherein the confirmation information is communicated to the mobile terminal through the cellular network communication channel.

55. A method configured to facilitate electronic communication of secure information, the method comprising:
storing registration information about a mobile terminal including a unique identifier associated to the mobile terminal;
storing account identification information of a financial account, the account identification information of the financial account being associated to the unique identifier;
receiving the unique identifier and a payment request for a transaction, information of the unique identifier and the payment request having been sent in a wireless communication by the mobile terminal through a wireless communication network, the associated account identification information of the financial account being excluded in the wireless communication; and sending, in connection with recognition by the system of the unique identifier and identification by the system of the associated account identification information of the financial account based on the recognized unique identifier, the associated account identification information of the financial account to accommodate a completion of processing the payment request with the associated account identification information of the financial account, the associated account identification information of the financial account being sent through a network connection, the recognition of the unique identifier corresponding to registered information of the unique identifier;

wherein the wireless communication network is separate from the network connection;

wherein the mobile terminal is a cellular phone;

wherein confirmation information is communicated based upon the completion of the processing of the payment request;

wherein the wireless communication comprises encrypted data;

wherein the encrypted data is decrypted during the processing of the payment request;

wherein the wireless communication network comprises a cellular network communication channel, the cellular network communication channel being separate from the network connection;

wherein commercial information related with the payment request is sent through the cellular network communication channel to the mobile terminal, the commercial information being related to the transaction associated with the payment request from the mobile terminal; and wherein the confirmation information about the completion of the processing the payment request is sent through the cellular network communication channel.

56. The method of claim 55, wherein the wireless communication network comprises a local area wireless network, the local area wireless network being separate from the network connection.

57. The method of claim 55, wherein the wireless communication network comprises a Blue-tooth communication channel, the Blue-tooth communication channel being separate from the network connection.

58. The method of claim 55, wherein the payment request is for a group transaction with a group discount for participation.

59. The method of claim 55, wherein the financial account is a reward account, a reward being provided for participating in the transaction.

60. The method of claim 55, wherein the network connection comprises a dedicated communication channel for payment processing.

61. The method of claim 55, wherein user authentication information is associated with the mobile terminal and used for authentication of a user of the mobile terminal prior the payment request having been sent in the wireless communication.

62. The system of claim 4, further comprising:

a database configured to store the registered information about the unique identifier associated to the account identification information of the financial account;

wherein user authentication information is associated with the mobile terminal and used for authentication of a user of the mobile terminal prior to the payment request having been sent in the short range electromagnetic radiation communication;

wherein commercial information related with the transaction is sent to the mobile terminal; wherein the commercial information is sent to the mobile terminal through a cellular network communication channel, the cellular network communication channel being separate from the network connection and separate from the short range wireless connection;

wherein confirmation information about the completion of the processing of the payment request is communicated to the mobile terminal through the cellular network communication channel.

63. The system of claim 62, wherein the network connection comprises a dedicated communication channel for payment processing.

64. The system of claim 62, wherein the financial account is a reward account wherein a reward is provided for participating in the transaction.

65. The system of claim 62, wherein location information of the mobile terminal is used for authentication of a user of the mobile terminal.

66. The method of claim 54, wherein the information of the unique identifier is encrypted.

67. The mobile terminal of claim 28, wherein the information of the unique identifier is encrypted.

68. The mobile terminal of claim 67, wherein user authentication information is associated with the mobile terminal and used for authentication of a user of the mobile terminal prior to the sending of the payment request.

69. The system of claim 62, wherein an RFID (radio frequency identification) tag is applied in a magnetic field induction; and wherein the magnetic field induction is applied in the short range electromagnetic radiation communication, the unique identifier corresponding to the RFID tog.

70. The system of claim 2, wherein an RFID tag is applied in a magnetic field induction; and wherein the magnetic field induction is applied in the short range electromagnetic radiation communication, the unique identifier corresponding to the RFID tag.

71. The mobile terminal of claim 20, wherein an RFID tag is applied in a magnetic field induction; and wherein the magnetic field induction is applied in the short range electromagnetic radiation communication, the unique identifier corresponding to the RFID tag.

72. The mobile terminal of claim 71, wherein the information of the unique identifier is encrypted: wherein user authentication information is associated with the mobile terminal and used for authentication of a user of the mobile terminal prior to the payment request having been sent in the short range electromagnetic radiation communication; and wherein the confirmation information is received through a cellular network communication channel, the cellular network communication channel being separate from the network connection and separate from the short range wireless connection.

73. The method of claim 66, wherein an RFID tag is applied in a magnetic field induction; wherein the magnetic field induction is applied in the short range electromagnetic radiation communication connection, the unique identifier corresponding to the RFID tag.

74. The method of claim 46, wherein an RFID tag is applied in a magnetic field induction; wherein the magnetic field induction is applied in the short range electromagnetic radiation communication, the unique identifier corresponding to the RFID tag.

75. The system claim of 1, wherein an RFID tag is applied in a magnetic field induction; and wherein the magnetic field induction is applied in the short range electromagnetic radiation communication, the unique identifier corresponding to the RFID tag.

76. The system of claim 29, wherein the information of the unique identifier is encrypted.

77. The method of claim 55, wherein the information of the unique identifier is encrypted.

78. The mobile terminal of claim 41, wherein the information of the unique identifier is encrypted.

\* \* \* \* \*